Nov. 6, 1934.　　　E. R. EVANS　　　1,979,874
BRAKE MECHANISM
Filed March 21, 1931　　　4 Sheets-Sheet 1
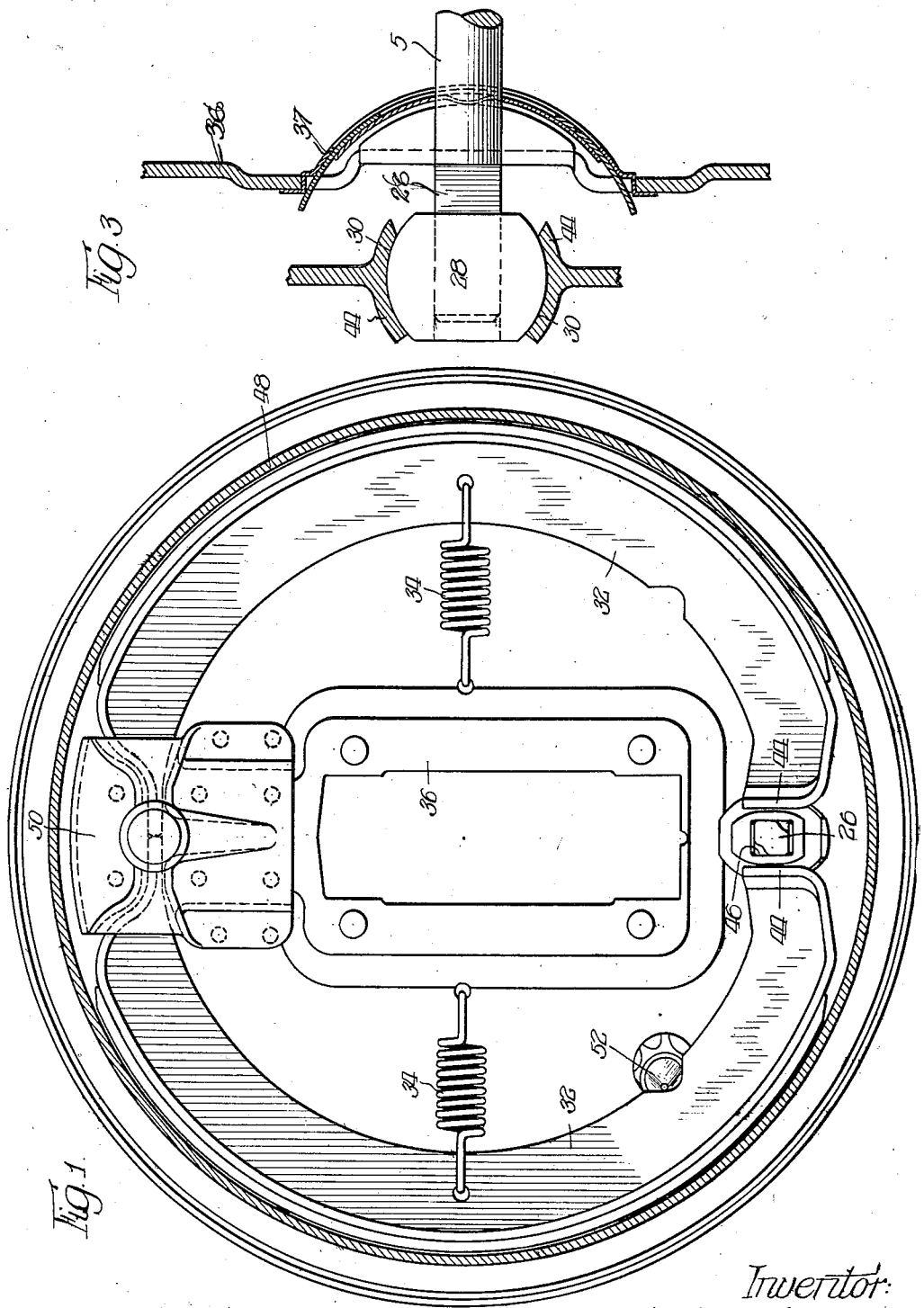

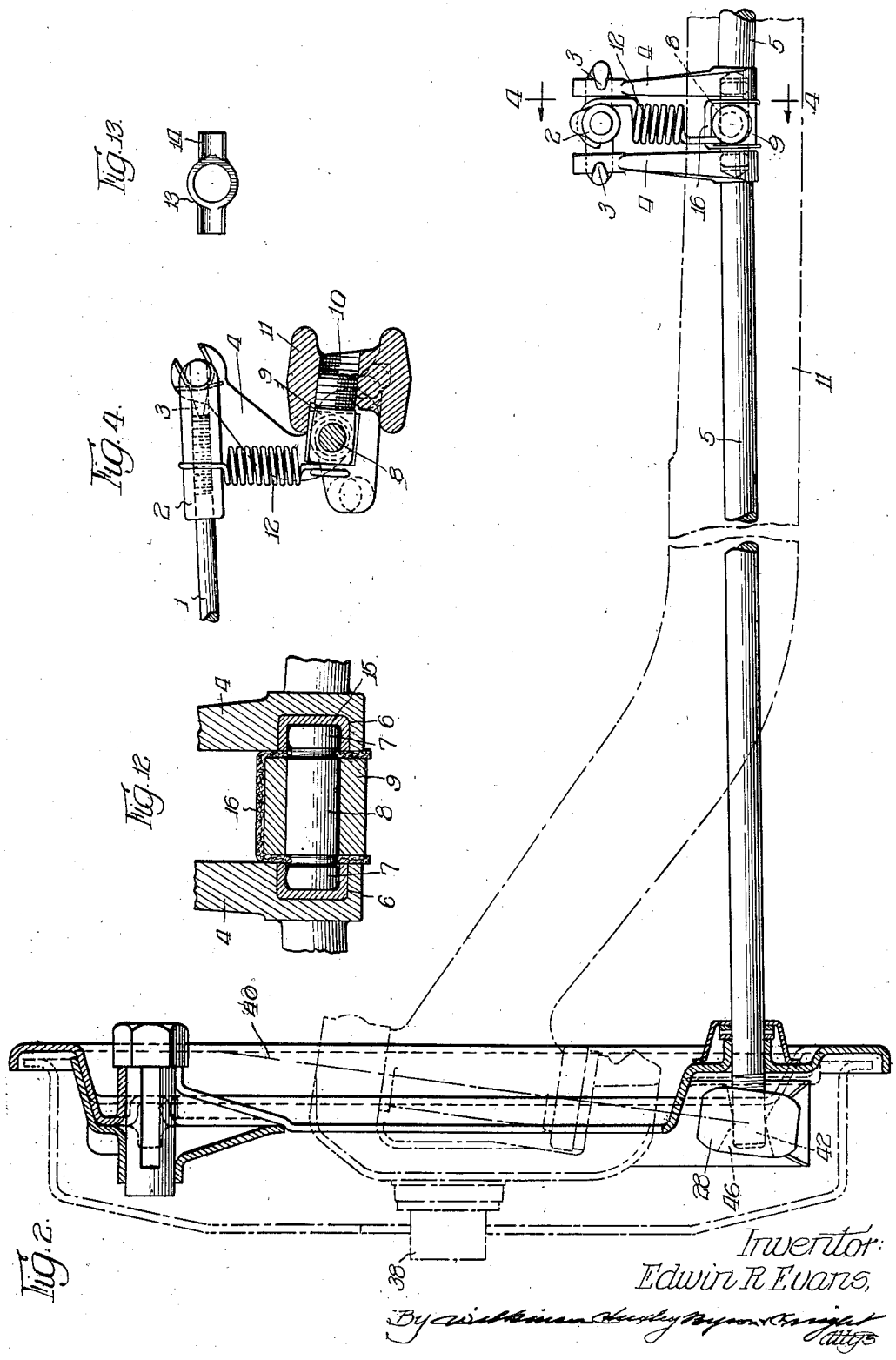

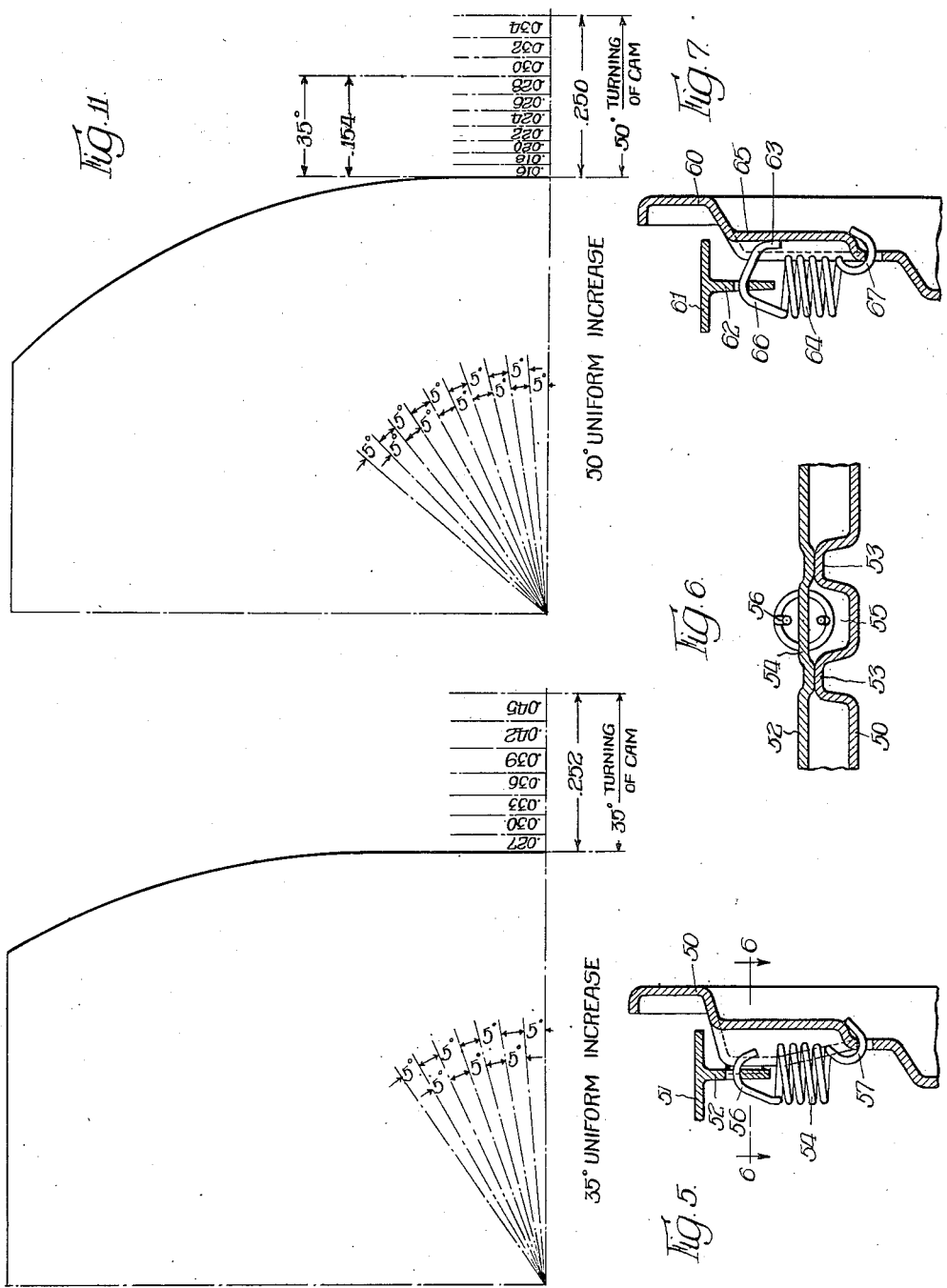

Nov. 6, 1934.  E. R. EVANS  1,979,874
BRAKE MECHANISM
Filed March 21, 1931    4 Sheets-Sheet 4
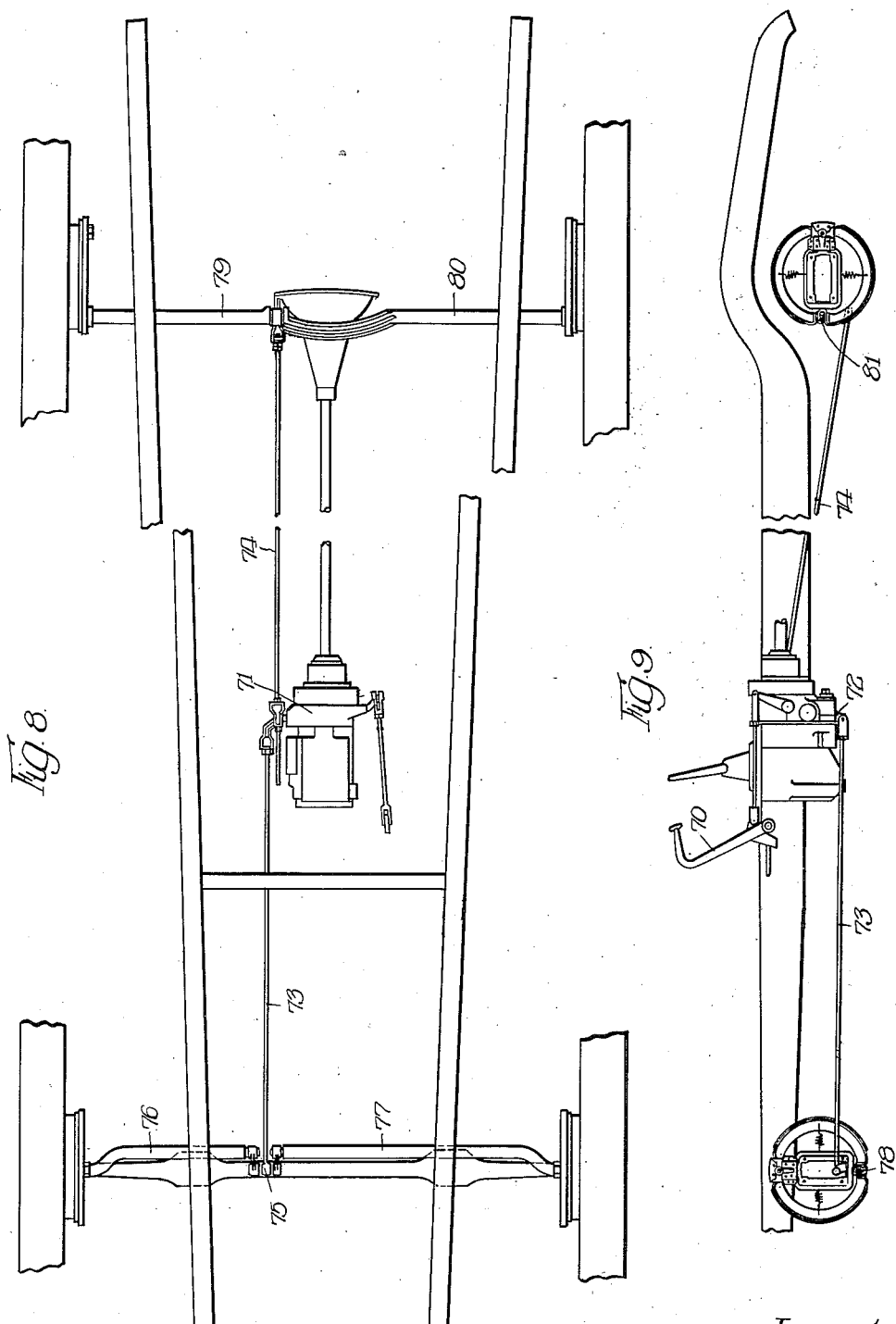

Patented Nov. 6, 1934

1,979,874

UNITED STATES PATENT OFFICE 1,979,874

BRAKING MECHANISM

Edwin R. Evans, Chicago, Ill.

Application March 21, 1931, Serial No. 524,257

5 Claims. (Cl. 188—10)

This invention relates to improvements in brakes and brake operating means and particularly resides in the improved cooperation between a brake actuating cam and the brake shoes and between the cam and the cam operating shaft.

It has been previously proposed to provide a cross shaft for actuating a wheel brake of a vehicle in which the shaft is supported at one end by an axle of the vehicle and carries at its free end a cam formed integral therewith or rigidly secured thereto which is adapted to transmit a thrust to expand a pair of brake shoes.

It is an object of the present invention to provide a construction in which the brake actuating cam is entirely supported by the brake shoes and separably engaged with the end of the cam operating shaft, whereby the cam may be replaced without removing or modifying the cam operating shaft.

It is further an object of the present invention to so design the separable connection between the cam operating shaft and the cam that the cam is permitted to align itself in a vertical plane with respect to the shaft and the design may be such that the cam is permitted to rock in a vertical plane through the axis of the shaft but is non-rotatably engaged by the shaft so that turning of the shaft will effectuate a turning of the cam and expansion of the brake shoes.

It is further an object of the present invention to provide in a complete four-wheel brake assembly a construction in which the cams, for the individual brakes, may be readily replaced so as to vary the proportionate braking effect between the individual wheel brakes and, according to my invention, if it is desired to produce a greater braking effect, a cam which produces a greater effective travel of the brake shoes, is used instead of a cam which has a greater leverage and therefore a lower rate of travel.

It is an additional object of the present invention to provide in association with the rigid brake linkage, means for insulating the connections between different brakes in order to prevent the occurrence of audible sound resulting from superimposing of high vibration of different brakes having different frequencies. Thus it is a feature of the invention that the vibration set up in one brake is localized or shielded from the vibration set up in another brake by the use of non-metallic material in the connections between the brakes.

Further and additional objects of the present invention will be more readily apparent from the following description taken in connection with the attached drawings, in which Figure 1 is a plan view of an assembly brake showing the brake drum in section and illustrating the connection of the shaft to the cam;

Figure 2 is a vertical section taken through the wheel brake assembly shown in Figure 1 and illustrating the support of the shaft upon the axle, diagrammatically shown;

Figure 3 is a detail horizontal section illustrating the connection of the shaft to the cam;

Figure 4 is a detail vertical section taken on the plane indicated 4—4 in Figure 2;

Figure 5 is a detail section of a modification of the spring connection between a brake shoe and the anchor plate;

Figure 6 is a detail section on the plane indicated 6—6 in Figure 5;

Figure 7 is a detail horizontal section similar to Figure 5 illustrating a further modification;

Figure 8 is a diagrammatic plan view of a chassis layout illustrating the brake linkage;

Figure 9 is a side elevation of Figure 8;

Figures 10 and 11 are diagrams of cams for producing different rates of travel;

Figure 12 is a detail section taken through the connection between the brake operating shafts and the supporting member therefor, and Figure 13 is a detail section illustrating the shape of a sound-absorbing leather piece in the connection between the brake pull rod and the brake operating cross shafts.

In the drawings a pull rod 1 is shown threadedly connected to one end to a T-shaped connecting member 2 having looped portions 3 which engage slots in the ends of levers 4 formed integral on the ends of brake operating shafts 5. The levers have recesses 6, co-axial with the shafts for universal support of the shafts on the rounded ends 7 of a pin 8 carried by the bracket 9 which is threadedly supported by an opening 10 formed in the front axle 11. A spring 12 extends between the bracket 9 and connecting member 2 to hold the parts in proper relation. In order to insulate the brake operating shafts 5 from each other and from the pull rod 1, I show a piece of leather or other non-metallic vibration-absorbing material 13 which fits around the stem of the T-shaped connecting member 2 and has lateral extending curved portions 14 which fit into the slots in the ends of levers 4 between the levers 4 and the projections 3 of the T-shaped connecting member 2.

Also I show, pressed into the recesses 6 of the levers 4, non-metallic material 16 which insulates the ends 7 of the pin 8 from the levers 4 and shafts 5. The material 16 is a fabric piece formed to fit over the fixed bracket 9 between the levers 4 and the bracket. By this construction it will be understood that vibrations transmitted through either of the shafts 5 from the brake actuated thereby cannot reach the shaft on the other side of the pull rod 1. Therefore audible sounds due to the superimposing of high vibrations set up by different brakes is prevented. It will be understood that similar insulation may be used at other points in the brake linkage to obtain the same results.

Each of the shafts 5 has a forged end 26 having diagonal squared corners. A brake shoe expanding cam 28 is slidably engaged by the squared end 26 of the shaft 5. The cam is substantially elliptical in vertical section and circular in horizontal section and has opposed camming surfaces, indicated 30—30 in Figure 3, and is supported between a pair of brake shoes 32—32 which are pressed into engagement with the cam 28 by the tension springs 34—34, extending between the brake shoes and an anchor or backing plate 36, which is fixed with respect to the steering knuckle 38 of the wheel. The swivelling axis 40, as indicated in Figure 2, is angular with respect to the plane of the wheel and intersects the median plane of the brake shoes at the center of the cam indicated 42 in Figure 2.

The camming surfaces 44 formed on the bent ends of the brake shoes are cylindrically formed on an axis in line with the swivelling axis 40 and the cam is so supported by the brake shoes that its axis is perpendicular to the swiveling axis 40. In order to permit the proper alignment of the cam with respect to the brake shoes, independent of the cam operating shaft 5, the opening 46 in the cam is formed with straight vertical walls to closely fit the end 26 of the shaft 5, as shown in Figure 3, so that the cam cannot rotate on its swivelling axis with respect to the cam shaft but the upper and lower walls of the opening 46 are cut away and inclined outwardly from the center of the cam, as shown in Figure 2, so that the cam is able to rock on a horizontal axis with respect to the shaft to correct itself for inaccuracies in the formation of the camming surfaces of the brake shoes and properly align itself. As shown in Figure 3 sealing means 37 may be provided between the backing plate 36 and the movable shaft 5.

The brake shoes are adapted to be expanded into engagement with the brake drum 48 carried by the wheel. The anchored ends of the brake shoes are received within a housing formed by a bracket 50 secured to the anchor plate 36. The pair of shoes together with the cam may be adjusted bodily with respect to the brake drum to properly center the shoes by an adjustable centralizer 52. During adjusting movement via the centralizer, the cam shaft turns about a pivot at its universal connection with the fixed bracket 9 where it is supported on the axle. It will be obvious that since the center of the cam is on the swivelling axis of the front wheel, that turning of the wheel for steering the vehicle will not prevent the effective operation of the cam since the brake shoes will be maintained in engagement with the cylindrical camming surfaces as they turn with respect to the swiveling axis of the cam.

An important feature of the present invention resides in the feature that the cams are replaceable, since they are freely separable from the cam operating shafts. For example, the brake linkage up to the cam may be designed with a standard leverage and if it is then desired to obtain a definite maximum brake pressure, it is only necessary to select a cam of the proper ratio. The different sizes of cams are designated by the number of degrees of turn required to produce a predetermined expansion of the shoes.

Figures 5, 6 and 7 illustrate different forms of connecting the pull-back springs which hold the brake shoes in released position with the backing or anchor plate. Thus in Figures 5 and 6 there is shown an anchor plate 50 and a brake shoe 51, T-shaped in cross section. The web 52 of the brake shoe seats against pressed-out portions 53 of the anchor plate and the tension spring 54 is received in the recess 55 between the pressed-out portions 53 of the anchor plate and has one end 56 bent to extend through an opening in the web of the brake shoe and the other end 57 bent to extend through an opening in the anchor plate. The tension spring, therefore, pulls the brake shoe in an angular direction to seat it against the anchor plate and properly centers and holds the shoes in position. The web of the shoe at the point at which it bears is formed with a boss which may be ground so that the shoes seat properly.

In Figure 7 there is a different construction in which there is shown an anchor plate 60, a T-shaped brake shoe 61 having a web 62 and a tension spring 64, which has one end 66 bent to extend through an opening in the web 62 of the brake shoe and terminating at a portion 63 abutting against a flat portion 65 of the anchor plate, the other end of the spring 64 being bent as at 67 to extend through an opening in the anchor plate. The spring 64 is therefore held against lateral movement by the cooperation between the end 63 and the anchor plate and properly centers the shoes.

Figures 8 and 9 illustrate diagrammatically a chassis lay-out and a brake linkage for actuating the four-wheel brakes of a vehicle and Figures 10 and 11 illustrate different designs of cams for actuating the rear and front brakes, respectively, of the vehicle. A brake pedal 70 serves as an actuating member for a power brake unit 71 from which the output movement is transmitted through a double arm brake lever to a forwardly extending pull rod 73 and a rearwardly extending pull rod 74. The pull rod 73 is connected through an equalizing link 75 to a pair of cross shafts 76 and 77 which engage at their ends brake-actuating cams 78 formed in a manner similar to the cams shown in Figures 1, 2 and 3. The pull rod 74 similarly connects to a pair of rear cross shafts 79 and 80 which actuate the rear brake cams 81 in the same manner as the front brake cams 78.

According to my improvement it is possible to design the brake linkage with a standard leverage up to the brake cams and then to proportion the relative braking effect of the front and rear brakes by using suitable shapes of cams. For example, if it is desired to obtain a greater braking effect at the front wheel brakes than at the rear wheel brakes, I may use a cam having a high rate of travel, as shown in Figure 10, for the front wheel brakes in which 35° turn will expand the brake shoes .252 inches, whereas, a low return cam is designed for the rear wheel brakes, as in Figure 11, in which 35° of turn will only expand the brake shoes .154 inches. Thus I will obtain a greater braking effect at the front wheel brakes, due to the greater travel and not by the effective higher leverage. It will be observed that by having the same leverage between the pedal and the cams of both the front and rear wheel brakes, the cams will turn an equal number of degrees upon actuation of the brakes but the front brake cam, if it has a greater effective travel, will impart a greater expansion to the brake shoes and therefore produce more braking than the rear brake cams. By my design in which the cam is readily replaceable, it is comparatively easy to change the relative proportion of braking effect by merely inserting a different shape of cam without modifying in any way the leverage of the standard brake linkage up to the cam.

It is desirable to use cams producing a uniform increase in movement of the brake shoes for each equal angle of rotation. In Figure 10 each five degrees rotation increases the increment of movement of the brake shoes .003 inches and in Figure 11 only .002 inches.

With a rigid power brake actuated linkage the braking effect may be carefully controlled and a relatively short movement of the linkage will be sufficient to fully apply the brakes.

I claim:

1. Brake mechanism comprising a pair of brakes, a single element for applying both of said brakes, a brake expanding cam associated with each of said brakes, linkage connections from said element to each of said cams for imparting equal angles of turn thereto, one of said cams being designed to impart a greater brake applying movement for an equal angle of turn than the other of said cams.

2. Brake mechanism for motor vehicles comprising front and rear wheel sets of brakes, a single element for applying all of said brakes, brake expanding cams associated with each of said brakes, linkage connections from said element for imparting equal angles of turn to all of said cams, the cams for one set of said brakes being designed to impart a greater brake applying movement for equal angles of turn than the cams for actuating the other set of brakes.

3. Brake mechanism for motor vehicles comprising front and rear wheel sets of brakes, a single element for applying both sets of brakes, a brake expanding cam for applying each of said brakes designed to impart a uniformly accelerated brake applying movement throughout its angle of turn, linkage connections from said element for turning each of said cams equally, the cams for one set of brakes being designed to impart a greater movement than the cams for the other set of brakes.

4. Brake mechanism for motor vehicles comprising front and rear sets of brakes, a single brake applying element for actuating each set of brakes, linkage connections from said element extending to each of said brakes, a brake expanding cam for each of said brakes separable from and replaceable with respect to said linkage whereby variations in braking effect of one set of brakes may be obtained by changing the cams therefor without modifying said linkage.

5. Brake mechanism for motor vehicles comprising front and rear sets of brakes, a single brake applying element for actuating all of said brakes, means for obtaining a greater effective braking by one set of brakes than by the other set of brakes comprising brake expanding cams for the brakes producing a greater braking effect designed to impart a greater brake applying movement for equal angles of turn than the cams for the other set of brakes.

EDWIN R. EVANS.